United States Patent [19]

Steele et al.

[11] Patent Number: 5,350,041

[45] Date of Patent: Sep. 27, 1994

[54] INTEGRAL ABS EXCITER RING FOR CAST IRON HUB

[75] Inventors: David R. Steele, Farmington Hills; Thomas B. Stimson, Commerce Township, Oakland County, both of Mich.

[73] Assignee: The Budd Company, Troy, Mich.

[21] Appl. No.: 975,647

[22] Filed: Nov. 13, 1992

Related U.S. Application Data

[63] Continuation-in-part of Ser. No. 682,098, Apr. 5, 1991, abandoned.

[51] Int. Cl.[5] .................................... B60T 8/60
[52] U.S. Cl. ........................ 188/18 R; 188/218 R; 303/91
[58] Field of Search ................. 164/111–113; 188/17, 18 A, 18 R, 181 A, 181 R, 218 R, 218 XL; 303/91

[56] References Cited

U.S. PATENT DOCUMENTS

| | | | |
|---|---|---|---|
| 3,626,226 | 12/1971 | Pauwels | 310/168 |
| 3,651,901 | 3/1972 | Burckhardt et al. | 188/181 A |
| 3,719,841 | 3/1973 | Ritsema | 310/155 |
| 3,793,545 | 2/1974 | Leiber et al. | 310/168 |
| 3,848,147 | 11/1974 | Anselmino | 188/181 R |
| 4,061,213 | 12/1977 | Davy | 188/181 R |
| 4,758,053 | 7/1988 | Yasuno | 303/91 |
| 5,067,597 | 11/1991 | Young | 188/181 R |

*Primary Examiner*—Robert J. Oberleitner
*Assistant Examiner*—Alfred Muratori
*Attorney, Agent, or Firm*—Harness, Dickey & Pierce

[57] ABSTRACT

A unitary hub and exciter ring for a motor vehicle equipped with an anti-lock braking system (ABS). The exciter ring is unitarily formed in the hub by machining grooves into the exterior surface of the hub and creating spaced teeth about the circumference of the hub. To ensure roundness and concentricity in the hub, and to ensure close tolerances in spacing between the ABS sensor and the teeth, machining is gaged off of bearing cups mounted within the internal bore of the hub.

5 Claims, 1 Drawing Sheet

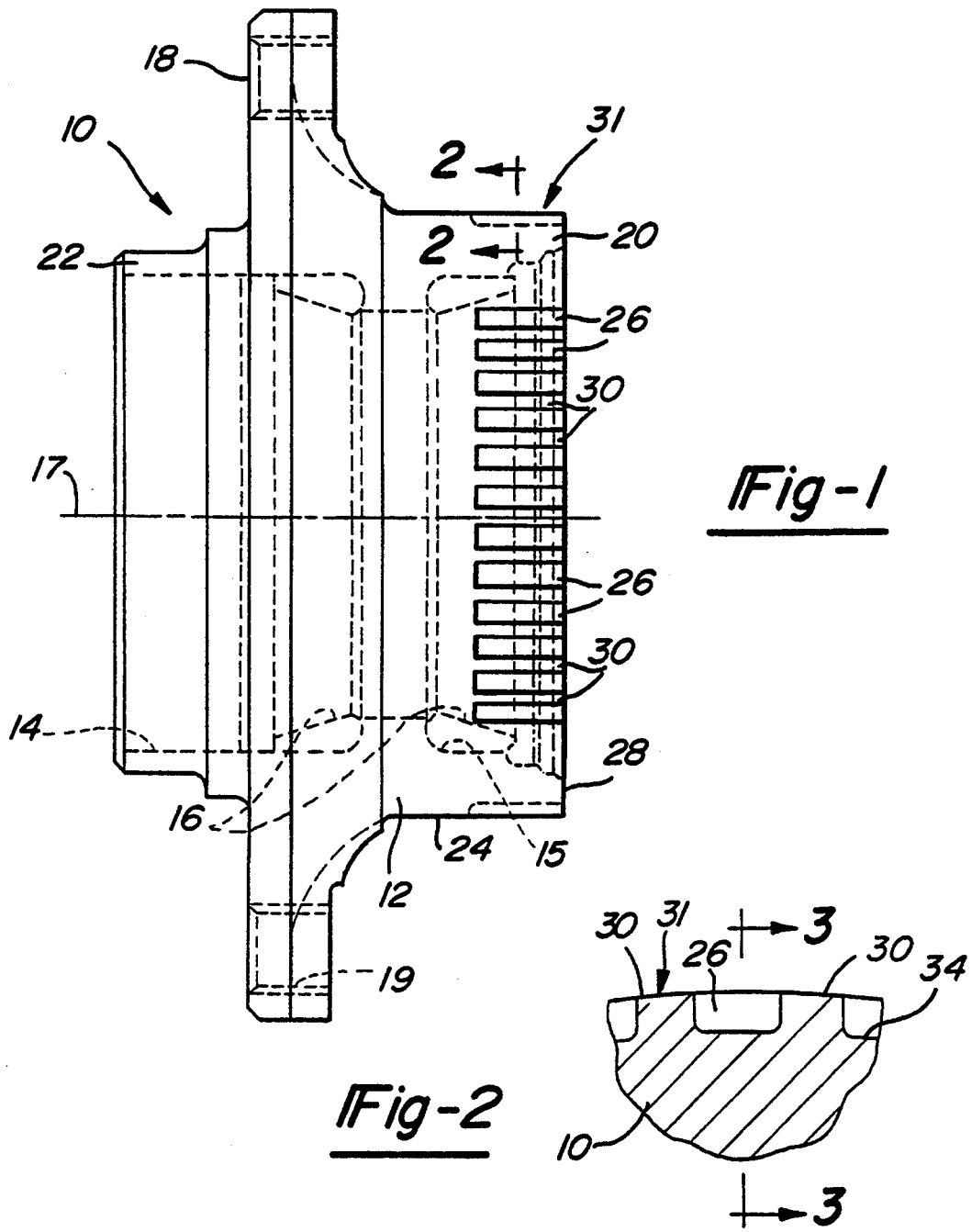
Fig-1
Fig-2
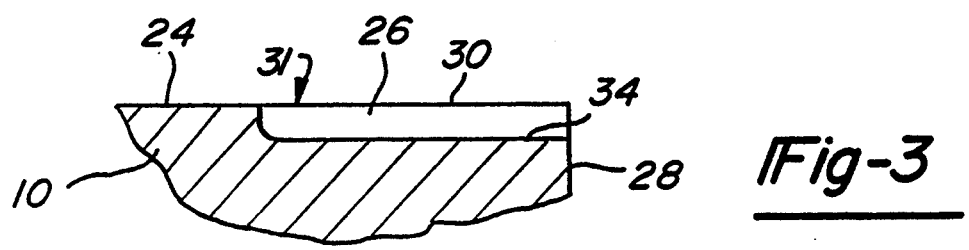
Fig-3

INTEGRAL ABS EXCITER RING FOR CAST IRON HUB

CROSS REFERENCE TO RELATED APPLICATION

This is a continuation-in-part of U.S. patent application Ser. No. 682,098, filed on Apr. 5, 1991, now abandoned.

BACKGROUND AND SUMMARY OF THE INVENTION

This invention relates to a motor vehicle hub for a vehicle having an anti-lock braking system and in particular to a cast iron hub having an integrally formed exciter ring.

Today, anti-lock braking systems, commonly known as ABS, are being found on an increasing number of motor vehicles. The ABS detects relative wheel rotation to prevent an impending wheel lock-up condition from occurring. Lock-up of the vehicle wheels is undesirable since it can result in both directional instability and increased vehicle stopping distances.

Advanced ABS designs employ a sensor at each wheel subject to ABS control. The sensors detect individual wheel rotation using various technologies, including variable reluctance sensors and inductive pick-ups. Signals from the sensors are fed into an ABS computer which determines whether wheel lock-up is impending and which, in response thereto, modulates the braking forces being applied to the vehicle wheels to prevent an impending wheel lock-up condition from occurring.

The variable reluctance and inductive pickup sensors are mounted to a stationary portion of the vehicle wheel assembly and use some type of tone wheel or exciter ring that rotates with the wheel. Hereinafter, the term "exciter ring" will be used to refer to any such member, the rotation of which is detected by the sensors. One common type of exciter ring is a cylindrical ring, formed by a strip of steel (or other material), that is perforated with a number of axially aligned slots. The strip is bent into the shape of a ring, with its two ends butt welded together, and is press fit over a cylindrical surface of the wheel hub so that it will rotate with the hub. The sensor is mounted to a non-rotating component of the vehicle's suspension and is spaced apart from the exciter ring.

Several problems are associated with such an exciter ring. First, it is necessary to maintain a precise clearance between the sensor and the exciter ring. This clearance is on the order of 0.030–0.050 inches. This small controlled clearance between the sensor and the exciter ring produces a higher sensor output to the ABS control resulting in better low speed response in the ABS system. If this clearance is not precisely maintained, the sensor, and hence the ABS, will not function as intended. With a press fit exciter ring fitted onto the hub, tolerance stack-ups can result in radial run out and variability in the clearance between the exciter ring and the sensor. Another problem is that the hoop stresses, formed in the exciter ring as a result of being press fit onto the hub, can cause failure of the butt weld and a resulting loss of the exciter ring. A further problem is created by corrosion of the exciter ring and/or the hub. Corrosion can also result in separation of the exciter ring from the hub. The first problem can result in improper functioning of the ABS while the second and third problems can result in a total ABS failure.

Accordingly, a principal objective of the present invention is to provide a hub and exciter ring assembly that overcomes the above limitations.

The present invention overcomes these limitations by unitarily or integrally forming the exciter ring as a part of the hub itself, rather than forming the exciter ring out of a separate component which must be mounted to the hub. One way to integrally forming the hub and exciter ring is to bond a steel ring to the hub by insert casting the ring in the hub. After casting, the hub is machined to expose the ring at the surface of the hub. The hub and ring are then machined to produce the necessary clearance between the hub surface and sensor. Grooves are subsequently machined into the ring to form spaced teeth around the hub.

To reduce the costs associated with insert casting, the present invention unitarily forms the exciter ring with the hub by machining the exciter ring directly into the hub surface. The hub is initially cast without having teeth for the exciter ring formed in it. Gaging off of bearing cups mounted to the interior cylindrical surface of the hub, the exterior cylindrical surface of the hub is machined to provide the proper clearance between the hub surface and the ABS sensor. Again gaging off of the bearing cups, grooves are cut into the exterior cylindrical surface of the hub forming spaced apart teeth. No additional machining is required.

By gaging off of the bearing cups during machining of the teeth and the exterior cylindrical surface, precise tolerances can be maintained for positioning the sensor relative to the exterior cylindrical surface. By gaging off of the bearing cups, surface roundness of the hub surface in general and the exciter ring portion in particular are also ensured.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a side elevational view of a unitary hub and exciter ring embodying the principles of the present invention;

FIG. 2 is a sectional view taken substantially along line 2—2 of FIG. 1 showing the teeth of the exciter ring portion of the hub; and FIG. 3 is a sectional view taken substantially along line 3—3 in FIG. 2 illustrating a portion of the exciter ring.

DETAILED DESCRIPTION OF THE PREFERRED EMBODIMENT

A motor vehicle wheel hub having a unitarily formed exciter ring according to the principles of the present invention is shown in FIG. 1 and generally designated at 10. The hub 10 includes a cylindrical body 12 which defines a central interior passageway 14. The passageway 14 is substantially cylindrical but is provided with seats 15 that are shaped to receive one or more bearing cups 16. The bearing cups 16 rotatably mount the hub 10 to a spindle or other suspension component (not shown) for rotation about a hub axis 17.

A wheel mounting flange 18 radially extends from the body 12 of the hub 10 and divides the hub 10 into inboard and outboard barrels or extensions 20 and 22. Apertures 19 are formed through the flange 18 and receive wheel mounting studs (not shown) for mounting a wheel and tire assembly (not shown) to the hub 10. As seen in FIG. 1, the inboard and outboard barrels 20 and 22 are also substantially cylindrical in shape. The substantially cylindrical exterior surface of the inboard barrel 20 is designated at 24.

Once the hub 10 has been rough cast, the interior passageway 14 of the hub 10 is machined to its proper dimensions. The seats 15 are also machined with the interior passageway 14 and receive the bearing cups 16 to mount the hub 10 to the vehicle.

Gaging off of the bearing cups 16, and therefore the rotational axis 17 of the hub 10, the exterior cylindrical surface 24 is machined to its proper dimension producing the desired clearance between the exterior surface 24 and the ABS sensor. By gaging off of the bearing cups 16 during machining, roundness and concentricity of the exterior surface 24 relative to the hub axis 17 is ensured. After the exterior surface 24 has been machined, a plurality of axial grooves 26 are machined or cut, again gaging off of the bearing cups 16, into the exterior surface 24 of the inboard barrel 20. The grooves 26 define equidistantly spaced teeth 30, one between each adjacent groove 26, and thereby create an exciter ring 31 unitarily and integrally with the hub 10. For the sake of clarity, only a representative number of the grooves 26 and the teeth 30 are shown in FIG. 1. Preferably, the exciter ring 31 is formed adjacent to the inboard end 28 of the hub 10.

The depths of the grooves 26 are less than the radial thickness of the inboard barrel 20 and thus provide a base 34 in the bottom of each groove 26 that connects the adjacent teeth 30. This base 34 assists in providing a magnetic flux path from one tooth 30 to another. The depth of each groove 26 is sufficient enough, however, to affect the output of the ABS sensor as it passes thereover. Therefore, the ABS sensor will alternately detect the teeth 30 and grooves 36. The length of each groove 26 is less than that of the inboard barrel 20 and generally corresponds to the size of the ABS sensor.

Since the exterior surface 24 of the hub 10 has already been machined to provide the proper clearance between it and the ABS sensor, there is no need to remachine those portions of the hub which now form the radial or outer cylindrical surfaces of the teeth 30. The exciter ring 31 is therefore also provided with the appropriate roundness and concentricity. With the radial or outer cylindrical surfaces of the teeth 30 being coincidental with the exterior surface 24 of the hub 10, the exciter ring 31 of the present invention provides for a very compact ABS construction. This is extremely beneficial in the wheel hub 10 area of a motor vehicle where space is at a premium. Also, since the exciter ring 31 is unitarily formed with the hub 10, tolerance stack-ups and radial run out are eliminated or substantially reduced between the hub 10 and the exciter ring 31.

While the magnetic permeability of the cast or ductile iron hub 10 may not as great as some other materials, it has been found that the extremely close clearance permitted by the present invention between the ABS sensor and the exciter ring 31 overcomes any limitations in magnetic permeability. Tests of the strength of the sensor signal generated when utilizing the present invention has been found, in some applications, to be too strong for some of the sensor systems in use requiring the voltages in the detection systems to be adjusted accordingly. Obviously, this is also a benefit of the present invention.

While the above description constitutes the preferred embodiment of the present invention, it will be appreciated that the invention is susceptible to modification, variation and change without departing from the proper scope and fair meaning of the accompanying claims.

We claim:

1. A unitary hub and exciter ring for a motor vehicle having an anti-lock braking system, said hub and exciter ring comprising:

a cast hub having a substantially cylindrical body including an outer cylindrical surface and an interior passageway defined by an inner cylindrical surface, means for rotatably mounting said hub to a suspension structure of the motor vehicle for rotation about an axis of rotation; and an exciter ring unitarily formed with said body of said hub, said exciter ring being defined by a plurality of axial grooves formed in said body and extending axially therealong, said grooves having a radial depth which extends only partially through said body of said hub, said grooves also defining a plurality of axially extending teeth therebetween, said teeth being equidistantly spaced and circumferentially positioned around said body of said hub, said teeth having an outer cylindrical surface coincidental with said outer cylindrical surface of said hub.

2. A unitary hub and exciter ring as set forth in claim 1 wherein said axial grooves are formed in said outer cylindrical surface of said body.

3. A unitary hub and exciter ring as set forth in claim 1 wherein said teeth are formed in said body of said hub generally adjacent to one axial end thereof.

4. A unitary hub and exciter ring as set forth in claim 1 wherein said hub is formed of cast iron.

5. A unitary hub and exciter ring as set forth in claim 1 wherein said mounting means is located within said passageway and cooperates to define a rotational axis.

* * * * *